United States Patent [19]
Orain

[11] 3,797,276
[45] Mar. 19, 1974

[54] SLIDING JOINT FOR TRANSMITTING TORQUE

[75] Inventor: Michel Orain, Conflans-Ste-Honorine, France

[73] Assignee: Societe Anonyme: Glaenzer Spicer, Poissy, France

[22] Filed: May 22, 1972

[21] Appl. No.: 255,459

[30] Foreign Application Priority Data
Dec. 10, 1971 France................................ 71.44408

[52] U.S. Cl. .................................................. 64/23.7
[51] Int. Cl. .............................................. F16d 3/06
[58] Field of Search ............................ 64/23.7, 9 A

[56] References Cited
UNITED STATES PATENTS
2,983,118  5/1961  Wicoff .................................. 64/9 A
1,609,851  12/1926  Wilson ................................ 64/23.7
3,012,421  12/1961  Cull ..................................... 64/9 A FOREIGN PATENTS OR APPLICATIONS
643,373  3/1937  Germany ............................. 64/9 A 1,228,149  3/1969  France ................................. 64/23.7

Primary Examiner—Charles J. Myhre
Attorney, Agent, or Firm—Baldwin, Wight & Brown

[57] ABSTRACT

A sliding joint for transmitting torque from a driving shaft to a driven shaft. One of the shafts is connected to a shank member and the other of the shafts to a sleeve member. The shank member is adapted to be displaced axially relative to the sleeve member. Balls are interposed between the members which are in addition provided with sockets and grooves respectively for housing the balls along their rolling paths of movement. The grooves are substantially semi-circular in cross section and extend parallel to the axis of the joint and regularly angularly spaced thereabout. The sockets on the other hand are divided into two axially spaced groups and are parallel to the grooves. The sockets have spherically shaped ends and middle sections in semi-circular cross section. The spherical ends of the sockets may be formed in stop members of material having a low coefficient of sliding friction.

6 Claims, 7 Drawing Figures

PATENTED MAR 19 1974 3,797,276

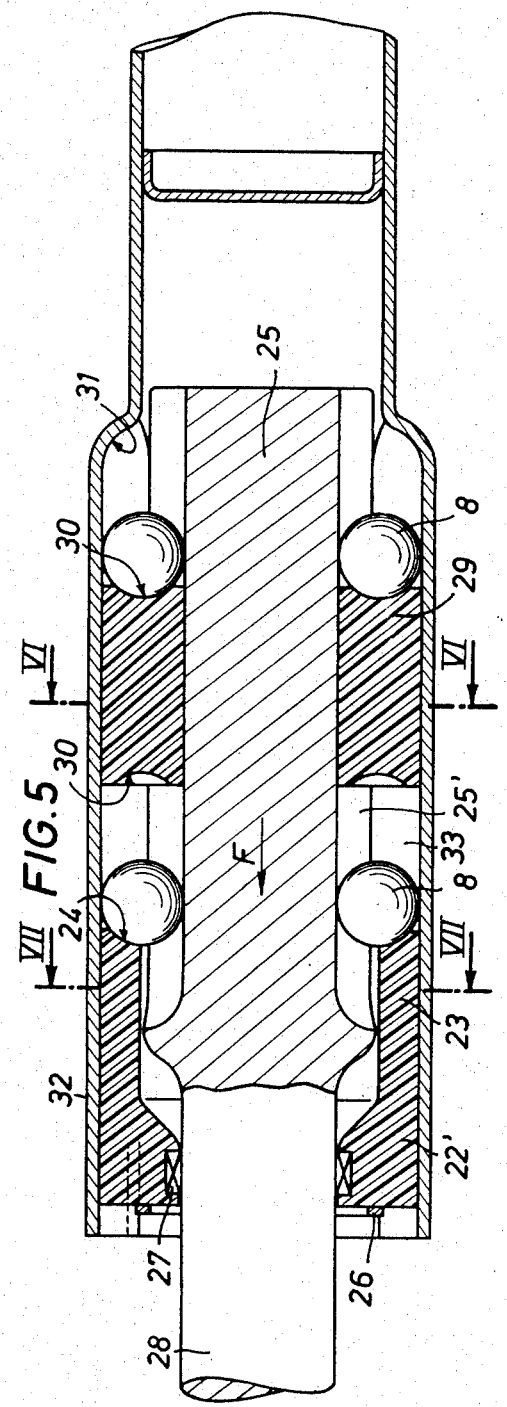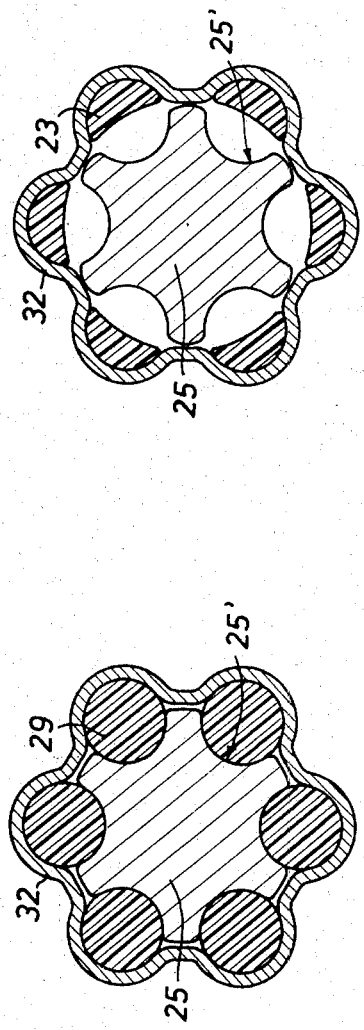

SLIDING JOINT FOR TRANSMITTING TORQUE

The present invention relates to a sliding joint for drive shafts.

Drive shafts for transmitting power by rotation between a driving shaft and a driven shaft generally comprise a telescopic device which enables to a certain extent the moving together and apart of the driving and driven shafts.

This function is normally fulfilled by a splined sliding arrangement comprising an externally splined shaft and an internally splined sleeve for smooth sliding cooperative engagement.

In spite of various improvements for reducing the friction in this type of telescopic joint, the main defect resides in the large force necessary for sliding when a considerable driving torque is transmitted. The replacement of sliding movement between the surfaces of the splines by ball bearings, roller bearings and needle bearings has also been considered. As a result, a large sought after reduction of the sliding force is obtained. On the other hand, difficulties of manufacture of a member capable of transmitting high torques have lead to expensive devices, therefore very limited commercial success.

The main object of the present invention is to provide a sliding joint which may slide readily, accepts heavy loads and is very economically manufactured.

Accordingly, the present invention consists in a sliding joint of the type comprising a shank member provided with exterior ball recesses and fixed to one of the shafts to be coupled and a sleeve member provided with interior ball recesses and fixed to the other shaft, balls being interposed in the recesses between members, the recesses of the one of the members being formed by grooves of substantially semi-circular section disposed parallel to the axis of the associated one of the members and regularly angularly distributed thereabout, the recesses in the other of the members being formed by at least two axially spaced series of sockets or cups regularly angularly distributed parallel to each one of the grooves of the said one of the members of substantially semi-circular section, the sockets having substantially spherical ends, and the length of the sockets being at least twice the diameter of the balls.

In such a joint the sockets with spherical ends provided on the periphery of the shank member enabling the balls to roll along the entire length of the sockets which brings about a path of very easy sliding equal to twice the length of the sockets. If under exceptional circumstances addition sliding freedom is required, for example during assembly or in case of severe use, the balls turn in sliding engagement after abutment against the spherical ends of the sockets enabling the sleeve member to continue its axial displacement relative to the shank member.

According to a first embodiment, the shank member comprises two series or groups of sockets formed by swaging and the sleeve comprises grooves formed by drawing and calibration, the balls being distributed in the two series or groups of sockets so as to form two parallel axially spaced annular members and rolling without any substantial amount of play in the channel formed by the sockets and the opposed grooves.

According to another embodiment, the shank member has the grooves and the sockets are provided in the sleeve member.

According to a further embodiment, the shank member has the grooves and the sockets are partially defined by the grooves formed in the sleeve and partially by stop members formed by the at least partially spherical ends of the said sockets having a low coefficient of sliding friction and fitted in the sleeve member.

Other features and advantages will be brought in the description which follows of embodiments of the device according to the invention, the description given merely by way of example with reference to the accompanying drawings, in which:

FIG. 5 illustrates a longitudinal section of a third embodiment.

FIG. 6 illustrates a cross section taken along the line VI—VI of the joint in FIG. 5; and FIG. 7 illustrates a cross section taken along the line VII—VII of the joint in FIG. 5.

Figure 1:
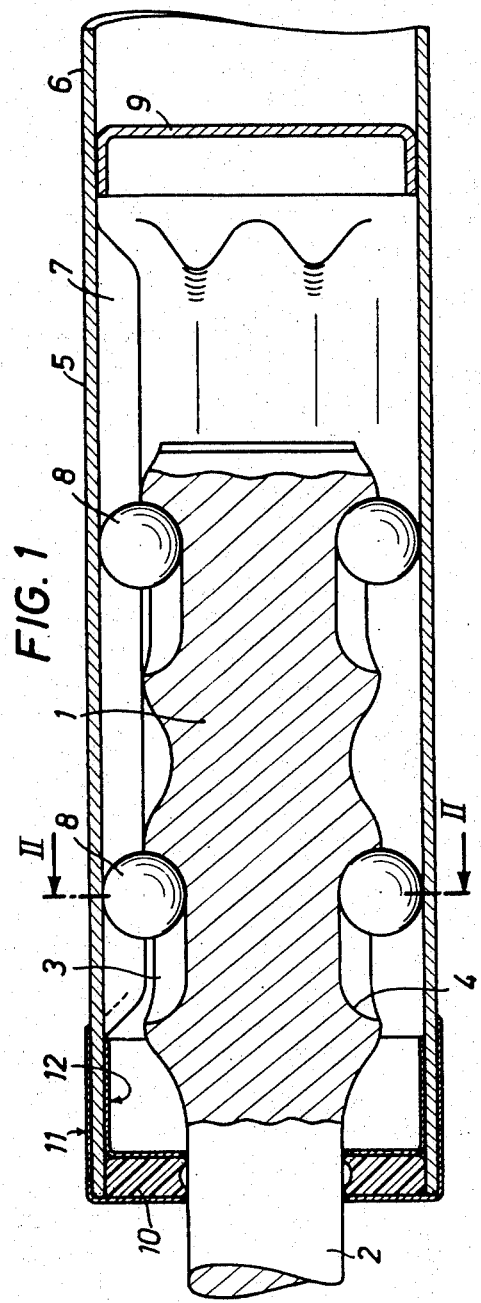
FIG. 1 illustrates a longitudinal section of a first embodiment of the joint according to the invention.
Figure 2:
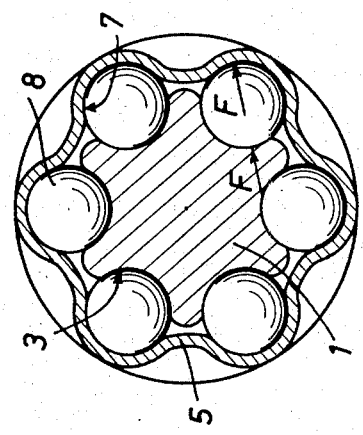
FIG. 2 illustrates a section taken along the line II—II in FIG. 1.

FIGS. 1 and 2 illustrate a first embodiment in which the shank member 1 fixed to one of the shafts 2 to be coupled has semi-circular or substantially semi-circular sockets 3 regularly distributed peripherally about, and disposed parallel to, the axis of the shank member 1 in two annular groups and the sockets 3 being delimited at their ends by spherical or substantially spherical surfaces. Shaft 2 may include at its other end a forked end of a Cardan universal joint, a gear wheel, splines or any other device enabling the application or transmission of torque.

Shank member 1 is displaceable in a tubular sleeve member 5 fixed to the other shaft 6 of the joint. Sleeve member 5 comprises internal grooves 7 of semi-circular or substantially semi-circular cross section extending along the length of the sleeve and regularly angularly distributed thereabout, the grooves facing each one of the sockets 3.

Further, in sockets 3 are disposed balls 8 of a diameter adapted to enable rolling substantially without play in the channels formed by the sockets 3 and the opposed grooves.

A force fitted end cap 9 retains the lubrication at an end while a seal or gasket 10 gripped between flanges 11 and 12 fixed to sleeve 5 ensures the fluid-tightness while allowing the passage of sliding shaft 2.

The sockets with spherical ends provided along the periphery of shank member 1 enable balls 8 to roll along the entire length of the sockets 3 which produces a very smooth sliding path equal to twice the length of the sockets. Under exceptional circumstances if an additional sliding freedom is required, for example during assembly or in the case of severe use, balls 8 turn in sliding engagement after abutment against the spherical ends of sockets 3 enabling sleeve 5 to continue its axial displacement relative to shank member 1.

When the shaft 2 carries a torque, load F (FIG. 2) is transmitted from sides of sockets 3 to balls 8 and in turn to the sides of grooves 7 thereby effecting the driving of sleeve 5 and shaft 6.

Such a joint is a heavy duty coupling. In fact the balls 8 roll in circular enclosed grooves and are disposed in two axially spaced annular groups in the shank member 1 which corresponds to maximum efficiency and produces an excellent guiding relative to the two principal members, i.e. shank member 1 and sleeve member 5, at a minimum cost.

The joint is also very easily manufactured owing to the fact that there are very few parts and the sockets in the shank member 1 may be formed by cold swaging and grooves 7 in sleeve 5 by drawing and calibration.

Further, the production cost of this joint is moderate on account of the small number of constituent parts, ideal use of the rolling bodies, the easy and speedy manufacture of sleeve member 5 and the shank member 1 by cold forming.

Figure 3:
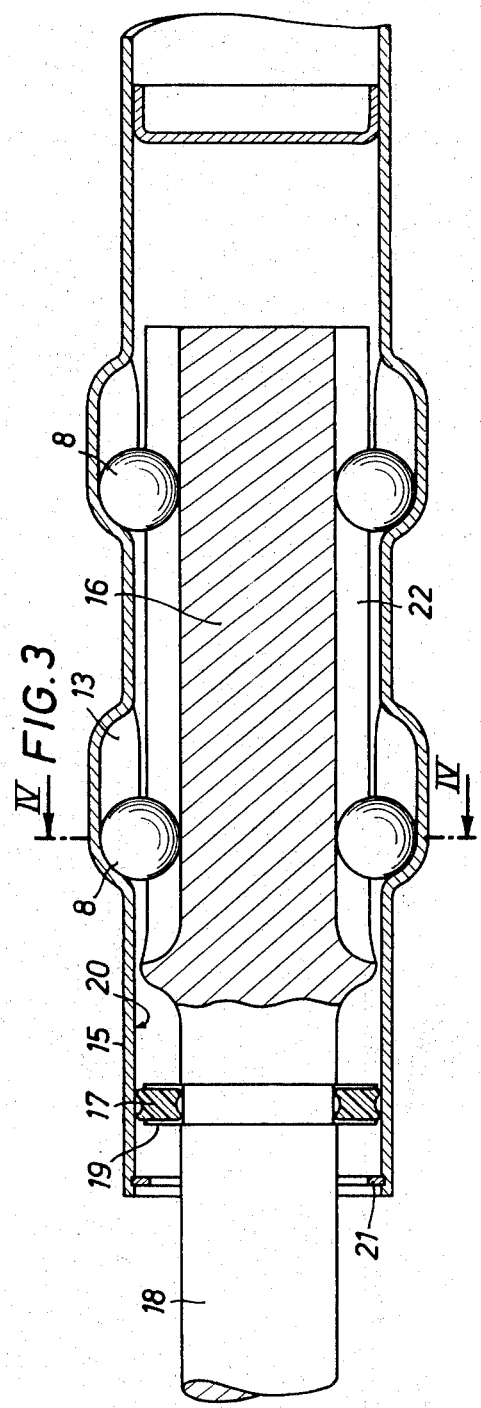
FIG. 3 illustrates a longitudinal section of another embodiment.
Figure 4:
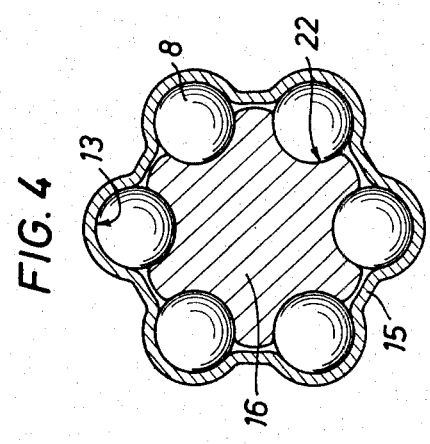
FIG. 4 illustrates a cross section along the line IV—IV of the joint of FIG. 3.

FIGS. 3 and 4 illustrate a second embodiment of the joint according to the invention.

In this embodiment, a shank member 16 is provided with grooves or splines 22 whereas sockets 13 are formed in sleeve 15. Sockets 13 are identical with sockets 3 of embodiment of FIG. 1 as to their semicircular cross-section, their spherical end surfaces 14 and the arrangement in two axially spaced annular groups in sleeve 15. Sockets 13 are formed in sleeve member 15, for example by application of an internal hydrostatic pressure by means of a piston, the tube to be formed being maintained in a die comprising a plurality of sections for enabling extraction after forming.

Fluid-tightness may be ensured by means of a seal or gasket 17 maintained on the shaft 18 by two keeper rings 19 and sliding in bore 20 in sleeve 15 or by any other suitable means.

A keeper ring 21 prevents the accidental disassembly during handling or mounting in a machine.

FIGS. 5, 6 and 7 illustrate a third embodiment. In this embodiment shank member 25 of shaft 28 has grooves or splines 25' identical to those of shank member 16 in the embodiment of FIG. 3.

Sleeve 32 also has grooves opposite the grooves 25' in the shank member. In this embodiment the sockets for receiving the balls 8 are disposed in sleeve member 32 and closed at their ends by means of inserted stop members 22' and 29 and preferably manufactured from a self-lubricating material or a material having a low coefficient of sliding friction such as bronzer, nylon, polyurethane.

Stop member 22' has an interior surface which fits exactly into sleeve member 32. Stop member 22' has a plurality of fingers 23 equal in number to grooves 33 in sleeve member 32. Each finger 23 terminates in a spherical surface 24 against which balls 8 slide in rotation at the end of their longitudinal path of movement while shank member 25 continues its displacement in the direction of arrow F. Stop member 22' is retained in the sleeve by keeper ring 26 and carries a sealing gasket 27 in which shaft 28 carrying shank member 25 slides.

The abutment of the balls is effected moreover at the end of cylindrical stop members 29 having concave end surfaces 30 and which are responsible for maintaining the distance between the two annular groups of balls. Said members 29 may be axially free or held in place with respect to shank member 25 or sleeve member 32, for example by means of circlips.

The spherical abutment end 31 is advantageously formed directly in sleeve member 32 but it could also be made by means of an inserted stop member similar to member 22'.

This embodiment as well as that of FIGS. 3 and 4 has the same features and advantages of the embodiment of FIG. 1 and 2 in the sense that two annular groups of balls adapted to roll in channel formed by the grooves on the shank or sleeve member and sockets with spherical ends formed on the opposed member.

Finally, the present invention is obviously not limited to the embodiments illustrated and described hereinbefore but on the contrary covers all possible modifications, alternatives and equivalents within the scope of the appended claims.

What we claim is:

1. A sliding joint comprising a shank member, a sleeve member, means for receiving balls along the exterior of the shank member and the interior of the sleeve member, balls of the same diameter interposed therebetween and both interconnecting said shank member and said sleeve member in rotational driving relation and maintaining axial alignment therebetween, the means in one of said members comprising grooves of substantially semi-circular cross-section extending parallel to the axis of said one member and regularly spaced thereabout, the means in the other of said members comprising two axially spaced and fixed groups of sockets regularly angularly spaced parallel to the grooves of said one member, said sockets having substantially semi-circular cross sections with substantially spherical ends and a length equal to at least twice the diameter of said balls, the total length of a pair of said axially aligned sockets being at a maximum equal to the length of a corresponding one of said grooves, and said balls being received in said grooves and sockets for rolling movement substantially without clearance.

2. A joint as claimed in claim 1, wherein said one member is said shank member and said other member is said sleeve member.

3. A joint as claimed in claim 2, wherein said sockets are partially defined by grooves formed in the sleeve member and partially by stop members forming the substantially spherical ends of the sockets, said stop members being formed of a material having a low coefficient of sliding friction fitted in the sleeve member.

4. A joint as claimed in claim 1 wherein said one member is said sleeve member and said other member is said shank member.

5. A joint as claimed in claim 1 wherein said one member is said sleeve member and said other member is said shank member, and said shank member is integrally formed between said axially spaced groups of sockets.

6. A joint as claimed in claim 1 wherein said one member is said shank member and said other member is said sleeve member, and said sleeve member is integrally formed between said axially spaced groups of sockets.

* * * * *